A. R. DODGE.
FLOW METER.
APPLICATION FILED MAY 1, 1914.
1,157,301.
Patented Oct. 19, 1915.
2 SHEETS—SHEET 1.
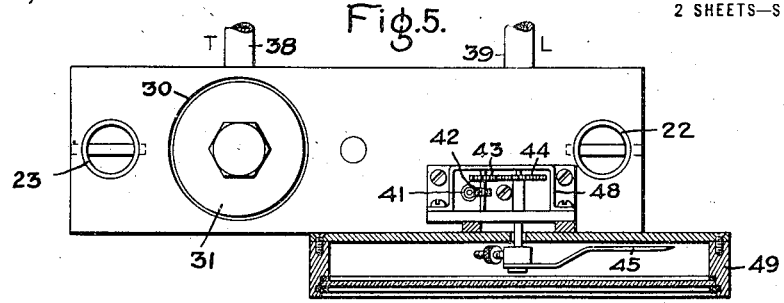
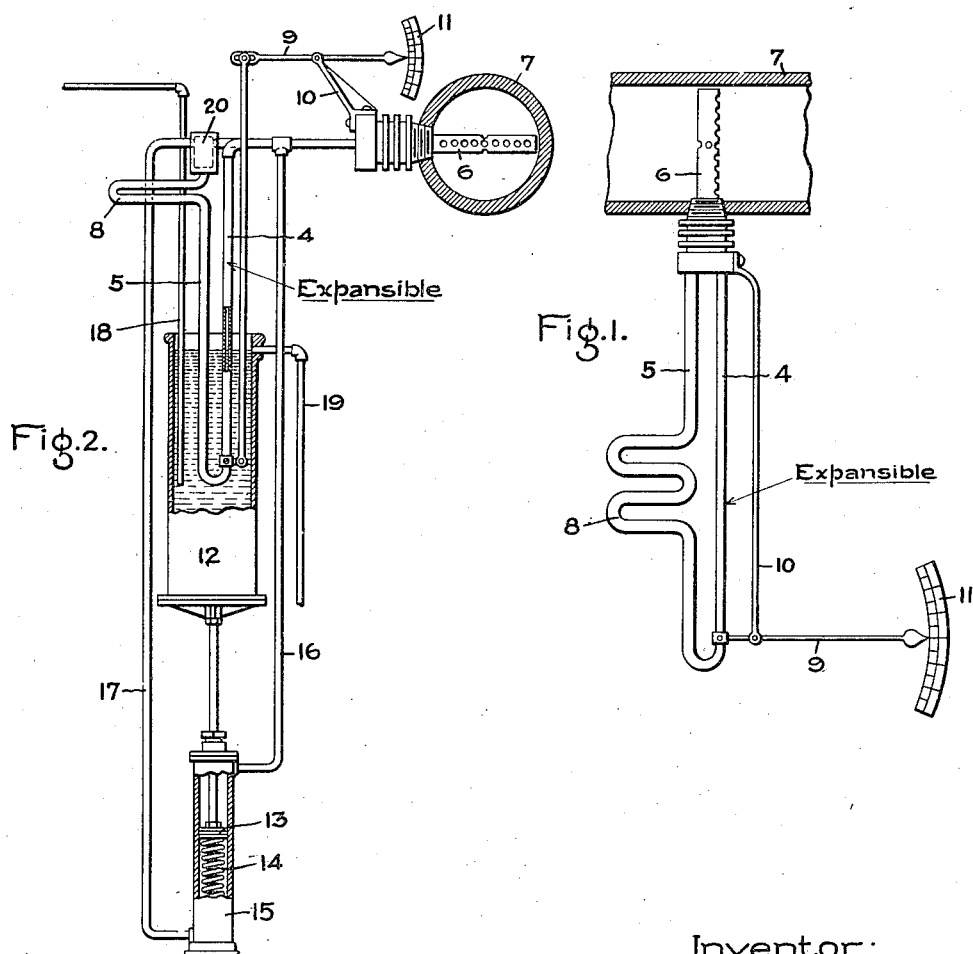
Witnesses:
Marcus L. Byng.
J. Ellis
Inventor:
Austin R. Dodge,
by
His Attorney.

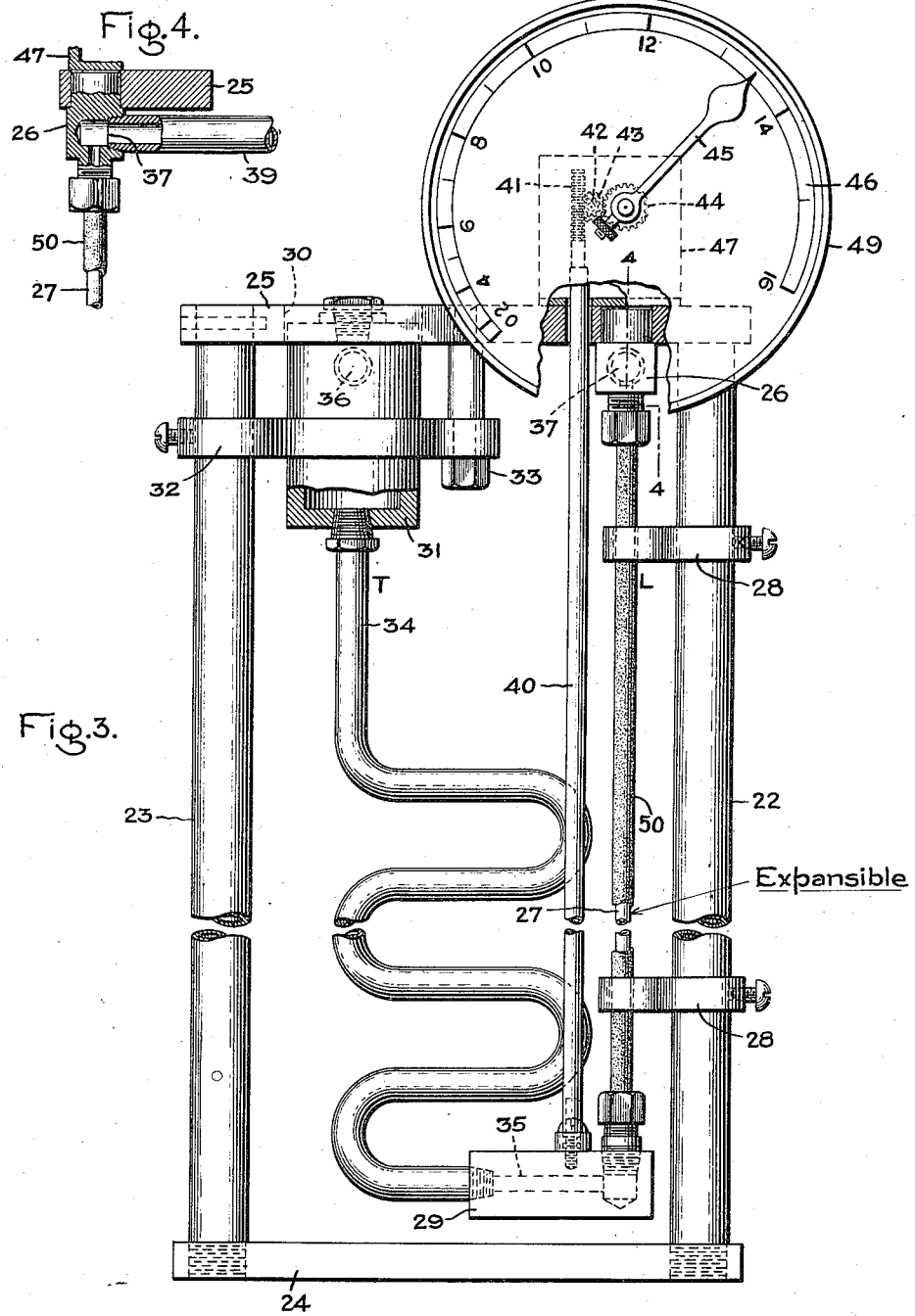

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

FLOW-METER.

1,157,301.

Specification of Letters Patent.

Patented Oct. 19, 1915.

Application filed May 1, 1914. Serial No. 835,691.

*To all whom it may concern:*

Be it known that I, AUSTIN R. DODGE, a citizen of the United States, residing at Schenectady, in the county of Schenectady, State of New York, have invented certain new and useful Improvements in Flow-Meters, of which the following is a specification.

The present invention relates to flow meters and particularly to flow meters for metering condensable vapors.

The invention is hereinafter described as being used to indicate steam flow, but it will be understood that it is not necessarily so limited.

One object of the invention is to provide a flow meter which is simple to construct, exceedingly light in weight, and which can be quickly and readily attached in position.

Further objects, as well as the nature and novel features of the invention will appear in the course of the following specification wherein I have described certain specific forms which my invention may take.

Referring to the drawing, Figure 1 is a view in side elevation of a meter embodying the principles of my invention; Figs. 2 and 3 are side elevations partly in section of other embodiments of my invention; Fig. 4 is a detail sectional view taken on line 4—4, Fig. 3; and Fig. 5 is a plan view partly in section of the arrangement shown in Fig. 3.

Referring first to Fig. 1 wherein I have illustrated a simple form or arrangement embodying my invention, 4 and 5 are the leading and trailing legs respectively of a U-tube which may be connected to any desired form of pressure difference creating device arranged in the conduit through which the steam to be metered flows. In the present instance the legs of the U-tube are shown as being connected to a nozzle plug 6 arranged in the conduit 7. The type of nozzle plug illustrated operates on the principle of the Pitot tube and is well known in this art.

The leading leg 4 is formed of a pipe of some material having preferably a fairly high coefficient of expansion, and may be termed the expansive member of the meter. The trailing leg 5 may be formed of the same or a different material. Suitable means are provided to permit the leading leg to expand and contract relative to the trailing leg. In the present instance the trailing leg is rendered elastic to a certain extent as by having one or more reverse bends 8 between its ends. Attached to the lower end of the expansive leg 4 is one end of a pointer 9 pivoted between its ends to the bracket 10 which is carried by the nozzle plug. The free end of the pointer works over a suitable scale 11.

At times of no flow, the two legs of the U-tube will be filled up to the nozzle plug with water and the pointer will stand at zero on the scale. If now a pressure difference is set up by the device 6, due to a flow through the conduit, the water in the leading leg 4 will be lowered by an amount proportional to the rate of flow, water at the same time being forced out of the trailing leg 5 into the conduit. The space above the water in the leg 4 will fill with steam which will raise the temperature thereof and cause the leg 4 to expand thereby moving the pointer 9. As will be clear the amount of expansion of the leg 4 will depend upon the length of the same exposed to the steam, and as this will be proportional to the flow as already explained, the movement of the pointer 9 can be made to coöperate with the scale to correctly indicate the flow. In the operation of a meter of this character when installed at a place where the temperature may vary over a fairly wide range from time to time, or where a higher degree of accuracy is required than would result from the simple arrangement as shown in Fig. 1, it is desirable to provide means for maintaining the portion of the leading leg which is not exposed to the steam at a substantially constant temperature. In Fig. 2 I have shown an arrangement for this purpose. The arrangement of the nozzle plug and U-tube in this figure is substantially the same as that already described in connection with Fig. 1 and corresponding parts have been designated by the same reference numerals. The reverse bend 8 in the trailing or elastic leg is arranged somewhat nearer the top of the U-tube than in Fig. 1, and the lower portion of the tube projects down into the receptacle 12. This receptacle contains a suitable cooling fluid as water. The level of the fluid in this receptacle as related to the U-tube is made to vary up and down with variations in the flow so as to maintain the level in the receptacle at a point on the leading leg even with the top of the water column therein. As one means for accomplishing this result, I support the receptacle on a piston 13 which in turn rests on a spring 14 in the cylinder 15. The upper surface of the piston is subjected to the leading pressure through pipe 16 and the lower surface to the trailing pressure through pipe 17. Cooling fluid is fed to the receptacle by pipe 18 and is maintained at a constant level therein by the overflow pipe 19, which may be made of elastic hose pipe for example to prevent interference with the movements of the receptacle. The spring 14 will be of such strength as to balance the weight of the receptacle 12 and its contents and maintain it in what may be termed its zero position at times of no flow. When a pressure difference is set up by the nozzle plug 6, due to a flow of fluid through the conduit 7, it will be clear that this pressure difference will operate to lower the water level in the leading leg 4 and at the same time operate to lower the receptacle 12. By this means the level of the cooling fluid may be kept in line with the level of the water column in the leading leg 4. In this figure the trailing leg is shown as being provided at its upper end with a reservoir 20 in order to minimize the error due to the change in the relation of the static heads in the two legs of the U-tube when there is a change in the rate of flow in a negative direction.

Referring now to Figs. 3, 4 and 5, 22 and 23 are a pair of hollow standards forming with the base plate 24 and top plate 25 a frame or support. Fastened into the top plate from the lower side thereof, as by means of a driving fit, is a hollow nipple or connector 26 into the bottom of which is fastened one end of the leading leg 27 of the U-tube, this leg being the expansible member of the meter and corresponding to the leg 4 of Fig. 1. The leg 27 passes through guides 28 carried by the standard 22 and has its lower end suitably secured in the block 29. The top plate 25 is provided with an opening 30 into which projects the upper end of the reservoir 31 supported by the bracket 32 carried by standard 23 and bolt 33. The reservoir is provided with an opening in its base into which is threaded one end of the trailing leg 34 of the U-tube, the other end of this leg being fastened into block 29. The leg has one or more bends for rendering it elastic as pointed out in connection with Fig. 1. The two legs of the U-tube communicate with each other through the passage 35 formed in the block 29. In the side wall and adjacent the top of the reservoir is an opening 36, which opening is at the same level as an opening 37 in the side of the connector 26. Into these openings 36 and 37 are threaded the pipes 38 and 39 which connect to the pressure difference creating device. Carried by the block 29 is a rod 40, upon the upper end of which is a rack 41. This rack meshes with a pinion 42 which, through pinions 43 and 44 moves the pointer 45 over the scale 46. The respective shafts for the pinions are suitably supported by the angle plate 47, which carries the U-shaped bracket 48. 49 is a suitable casing having a glazed front within which is arranged the scale and pointer. In the arrangement illustrated in these figures the leading leg 27 is shown as being lagged as indicated at 50 so as to prevent the same from being affected to any appreciable extent by variations in the room temperature where the instrument is installed.

The operation of the arrangement of Figs. 3 to 5 will be obvious from the description already given in connection with Figs. 1 and 2, the expansion and contraction of the leg 27 acting through the rod 40 to move the pointer 45.

It will be noted that the openings 36 and 37 are at the same level so that the static pressure heads in the two legs of the U-tube are the same at no flow. Whenever there is a decrease in the rate of flow, the water level in the trailing leg falls. This unbalances the relation of the static heads and introduces an error until normal level is restored by condensation. The purpose of the reservoir 31, as already explained in connection with the reservoir 20 in Fig. 2 is to minimize the amount of error due to this cause, since owing to the larger area of the reservoir as compared with the leg 34 there will be a much less unbalancing of the pressure heads.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a flow meter, the combination of an agent adapted to create a pressure difference which bears a definite relation to the rate of flow, an expansible tube connected at one end to the leading side of the agent, and means connecting the other end of the expansible tube to the trailing side of the agent, said means being constructed and arranged so that the expansible tube may expand and contract due to temperature changes while said means remains at substantially the same temperature.

2. In a flow meter, the combination of an agent adapted to create a pressure difference which bears a definite relation to the rate of flow, an expansible tube connected at one end to the leading side of the agent, means connecting the other end of the expansible tube to the trailing side of the agent, said means being constructed and arranged so that the expansible tube may expand and contract due to temperature changes while said means remains at substantially the same temperature, and an indicating device responsive to variations in the length of said expansible tube.

3. In a flow meter, the combination of an agent for creating a pressure difference which bears a definite relation to the rate of flow, and a U-tube connected thereto, one leg of said U-tube being made of expansible material, and the other leg being reversely bent upon itself to render it elastic.

4. In a flow meter, the combination of a nozzle plug, a U-tube connected to and carried by said plug, one leg of said U-tube being made of expansible material and the other leg being elastic, an indicating device, and means connecting the expansible leg to the indicating device.

5. In a flow meter, the combination of a nozzle plug, a U-tube connected to and carried by said plug, one leg of said U-tube being made of expansible material, and the other leg being reversely bent upon itself to render it elastic, an indicating device, and means connecting the expansible leg to the indicating device.

6. In a flow meter, the combination of a nozzle plug, a U-tube connected to and carried by said plug, one leg of said U-tube being made of expansible material, and the other leg being elastic, an indicating device, and means connecting the expansible leg to the indicating device, the upper end of said elastic leg being in the form of a reservoir.

7. In a flow meter, the combination of an agent adapted to create a pressure difference which bears a definite relation to the rate of flow, an expansible tube connected at one end to the leading side of the agent, means connecting the other end of the expansible tube to the trailing side of the agent, said means being constructed and arranged so that the expansible tube may expand and contract due to temperature changes while said means remains at substantially the same temperature, and means for protecting the expansible tube from variations in the temperature.

8. In a flow meter, the combination of an agent for creating a pressure difference which bears a definite relation to the rate of flow, a U-tube connected thereto, one leg of said U-tube being made of expansible material, and the other leg being reversely bent upon itself to render it elastic, and means for protecting the expansible leg from variations in temperature.

9. In a flow meter for measuring condensable vapors, the combination of an agent for creating a pressure difference which bears a definite relation to the rate of flow, a U-tube connected thereto, one leg of said U-tube being made of expansible material and the other leg being elastic, said U-tube having liquid of condensation therein the height of which in the expansible leg varies with variations in the pressure difference set up by said agent, a receptacle for containing cooling fluid into which said expansible leg extends, and means for maintaining the level of the cooling fluid in the receptacle in line with the top of the column of liquid of condensation in the expansible leg.

10. In a flow meter for measuring condensable vapors, the combination of an agent for creating a pressure difference which bears a definite relation to the rate of flow, a U-tube connected thereto, one leg of said U-tube being made of expansible material, said U-tube having liquid of condensation therein the height of which in the expansible leg varies with variations in the pressure difference set up by said agent, a receptacle for containing cooling fluid into which said expansible leg extends, and automatic means controlled by the pressure difference set up by said agent for maintaining the level of the cooling fluid in the receptacle in line with the top of the column of liquid of condensation in the expansible leg.

11. In a flow meter for measuring condensable vapors, the combination of an agent for creating a pressure difference which bears a definite relation to the rate of flow, a U-tube connected thereto, one leg of said U-tube being made of expansible material and the other leg being elastic, said U-tube having liquid of condensation therein the height of which in the expansible leg varies with variations in the pressure difference set up by said agent, a receptacle for containing cooling fluid into which said expansible leg extends, means for maintaining a constant level of cooling fluid in said receptacle, and means for moving the receptacle in response to variations in the pressure difference set up by said agent to keep the level of the cooling fluid in line with the top of the column of liquid of condensation in the expansible leg.

12. In a flow meter for measuring condensable vapors, the combination of an agent for creating a pressure difference which bears a definite relation to the rate of flow, and a U-tube connected thereto, one leg of said U-tube being made of expansible material and having liquid of condensation therein, the height of which in the expansible leg varies with variations in the pressure difference set up by said agent.

13. In a flow meter for measuring condensable vapors, the combination of an agent adapted to create a pressure difference which bears a definite relation to the rate of flow, and a U-tube connected thereto, one leg of said U-tube being made of expansible material, the other leg being elastic, said U-tube having liquid of condensation therein the height of which in the expansible leg varies with the variations in the pressure difference set up by said agent.

In witness whereof, I have hereunto set my hand this 30th day of April, 1914.

AUSTIN R. DODGE.

Witnesses:
  HELEN ORFORD,
  MARGARET E. WOOLLEY.